United States Patent
Sasaki et al.

(10) Patent No.: US 12,517,145 B2
(45) Date of Patent: Jan. 6, 2026

(54) AUTOMATIC ANALYZER

(71) Applicant: HITACHI HIGH-TECH CORPORATION, Tokyo (JP)

(72) Inventors: Shunsuke Sasaki, Tokyo (JP); Kenta Imai, Tokyo (JP); Masashi Akutsu, Tokyo (JP); Osamu Watabe, Tokyo (JP); Satoshi Shibuya, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 428 days.

(21) Appl. No.: 18/001,609

(22) PCT Filed: Feb. 16, 2021

(86) PCT No.: PCT/JP2021/005701
§ 371 (c)(1),
(2) Date: Dec. 13, 2022

(87) PCT Pub. No.: WO2021/255995
PCT Pub. Date: Dec. 23, 2021

(65) Prior Publication Data
US 2023/0228777 A1    Jul. 20, 2023

(30) Foreign Application Priority Data
Jun. 19, 2020    (JP) .................. 2020-105970

(51) Int. Cl.
*G01N 35/02* (2006.01)
*G01N 35/00* (2006.01)
(Continued)

(52) U.S. Cl.
CPC ... *G01N 35/00871* (2013.01); *G01N 35/1002* (2013.01); *G01N 2035/00306* (2013.01);
(Continued)

(58) Field of Classification Search
CPC ........................................ G01N 2035/0091
See application file for complete search history.

(56) References Cited

U.S. PATENT DOCUMENTS 5,578,269 A * 11/1996 Yaremko .............. G01N 35/025
422/65
6,090,630 A    7/2000 Koakutsu et al.
(Continued)

FOREIGN PATENT DOCUMENTS

| CN | 110235000 A | 9/2019 |
| CN | 110366683 A | 10/2019 |

(Continued)

OTHER PUBLICATIONS

International Search Report, mailed Apr. 27, 2021, for International Application No. PCT/JP2021/005701.
(Continued)

*Primary Examiner* — John E Breene
*Assistant Examiner* — Alex T Devito
(74) *Attorney, Agent, or Firm* — Baker Botts L.L.P.

(57) ABSTRACT

An operator can perform exchange work of a reagent container without including a mechanism for reagent exchange and interrupting an analysis operation.
An automatic analyzer includes: an analysis unit including a plurality of operation units for performing analysis of a specimen; and a control unit for controlling the analysis unit. The control unit allows the analysis unit to set to at least (a) an analysis operation mode in which a first and a second operation unit are operated for the analysis of the specimen, (b) a partial operation mode in which only the first operation unit is continuously operated after the analysis of the specimen is completed in the analysis operation mode, and (c) a reagent exchange mode in which consumables containing a reagent are exchangeable in the analysis unit. The control
(Continued)

unit allows the analysis unit to shift from the partial operation mode to the reagent exchange mode.

16 Claims, 9 Drawing Sheets

(51) Int. Cl.
*G01N 35/10* (2006.01)
*G01N 35/04* (2006.01)

(52) U.S. Cl.
CPC .............. *G01N 2035/00356* (2013.01); *G01N 2035/00831* (2013.01); *G01N 2035/00891* (2013.01); *G01N 2035/0405* (2013.01)

(56) References Cited

U.S. PATENT DOCUMENTS

| | | | |
|---|---|---|---|
| 6,579,717 B1 | 6/2003 | Matsubara et al. | |
| 7,931,863 B2 | 4/2011 | Kitagawa et al. | |
| 11,156,625 B2 | 10/2021 | Yabutani et al. | |
| 2008/0014118 A1 | 1/2008 | Kitagawa et al. | |
| 2008/0063570 A1 | 3/2008 | Fujino et al. | |
| 2008/0240989 A1 | 10/2008 | Iwamatsu et al. | |
| 2012/0129247 A1* | 5/2012 | Tanoshima ....... | G01N 35/00732 435/286.1 |
| 2013/0089464 A1 | 4/2013 | Sakashita et al. | |
| 2013/0243652 A1* | 9/2013 | Nishigaki ........ | G01N 35/00584 422/68.1 |
| 2014/0038298 A1* | 2/2014 | Yu ...................... | G01N 35/0092 422/65 |
| 2019/0361041 A1 | 11/2019 | Sasaki et al. | |
| 2020/0110104 A1 | 4/2020 | Joji | |
| 2020/0241029 A1 | 7/2020 | Imai et al. | |

FOREIGN PATENT DOCUMENTS

| | | | | |
|---|---|---|---|---|
| CN | 110857946 A | 3/2020 | | |
| CN | 111094994 A | 5/2020 | | |
| DE | 4313807 A1 * | 11/1993 | ........ | G01N 33/54366 |
| JP | 3597958 B2 | 12/2004 | | |
| JP | 2008-249442 A | 10/2008 | | |
| JP | 2012-189611 A | 10/2012 | | |
| JP | 2020-030089 A | 2/2020 | | |
| WO | WO-2019053991 A1 * | 3/2019 | ............. | G01N 33/49 |

OTHER PUBLICATIONS

Extended European Search Report, mailed May 31, 2024, for European Application No. 21824905.0.

First Office Action, issued Aug. 16, 2025, for Chinese Application No. 202180042405.X (with English translation).

* cited by examiner

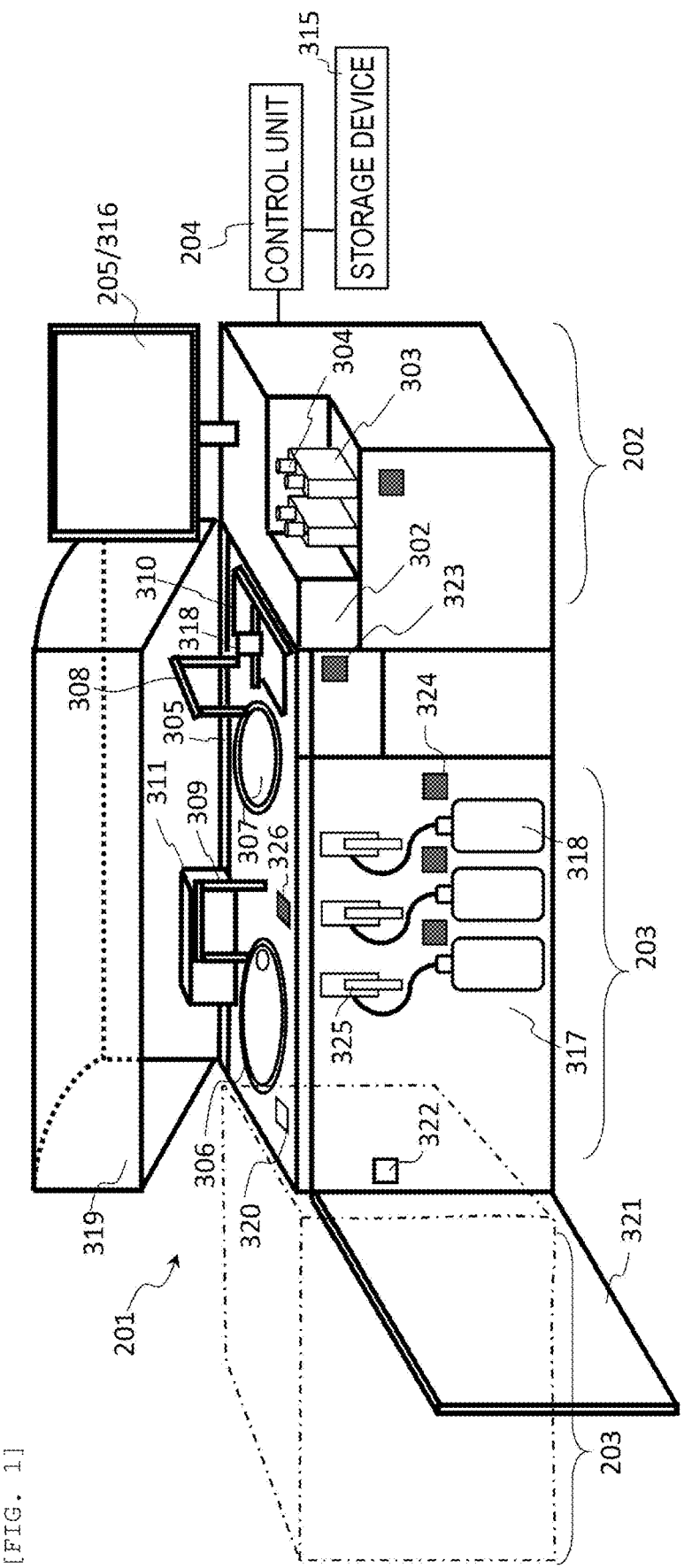
[FIG. 1]

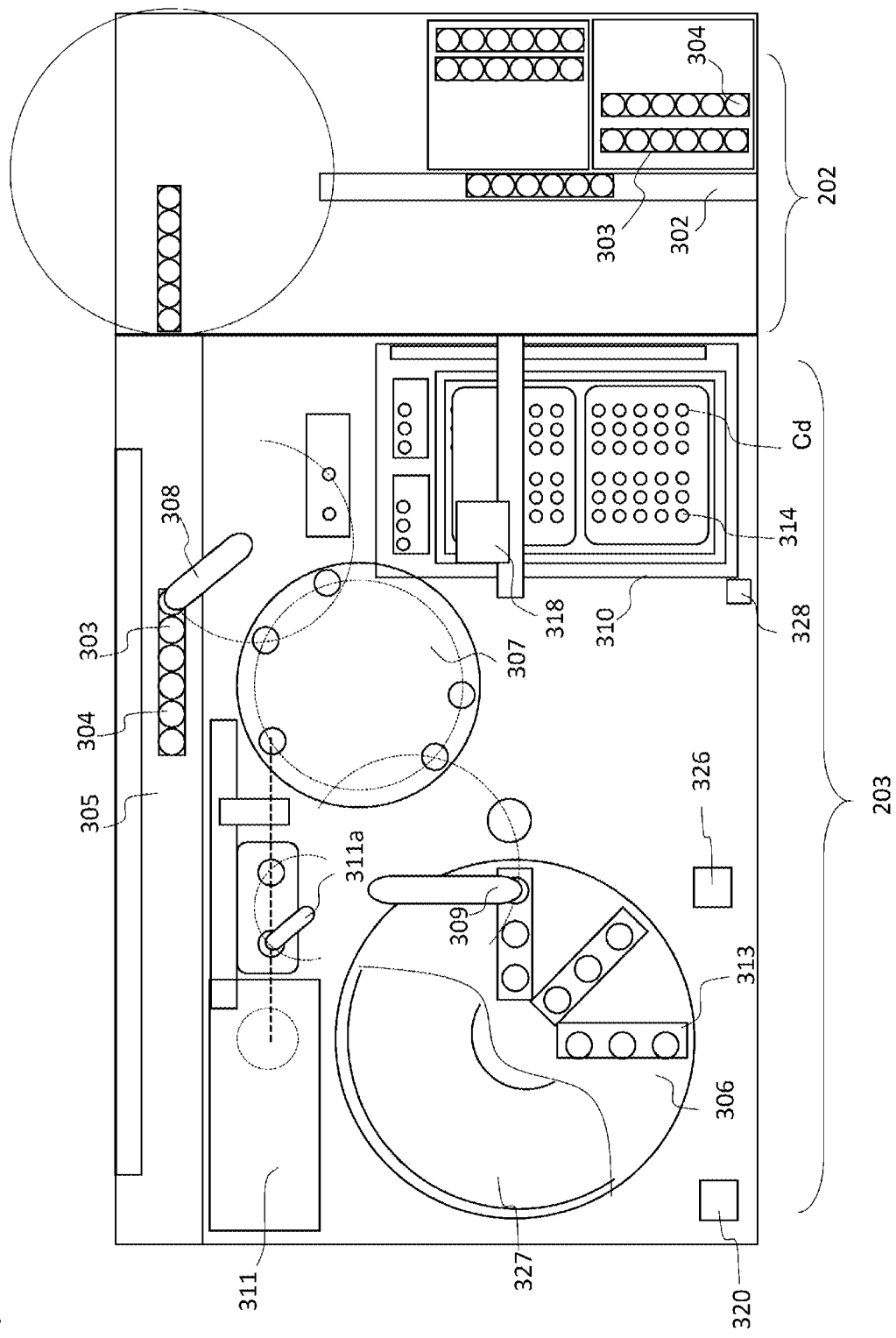
[FIG. 2]

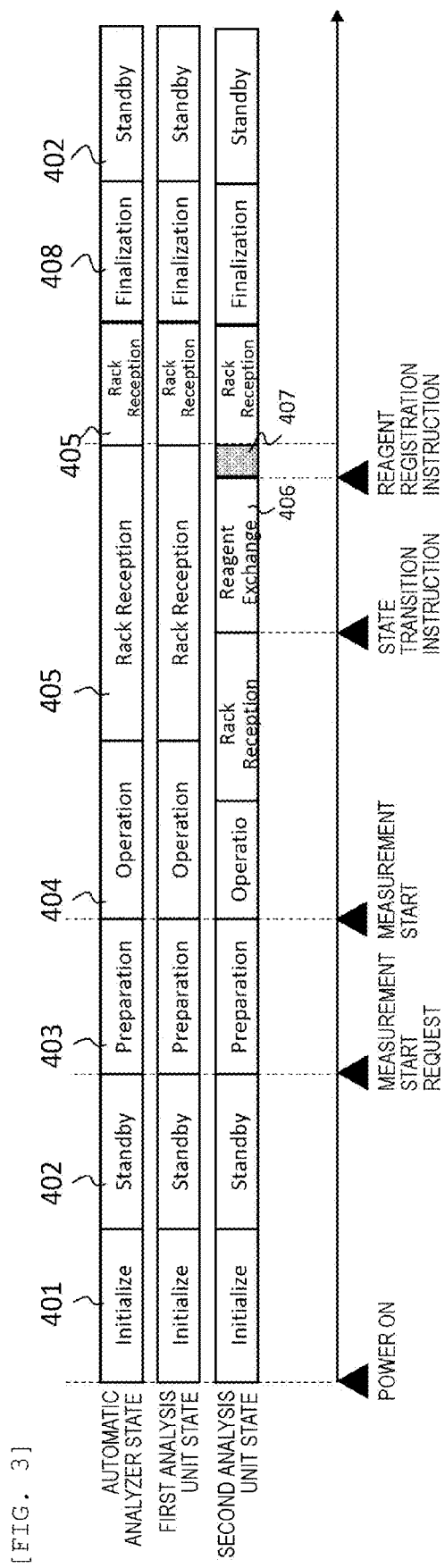

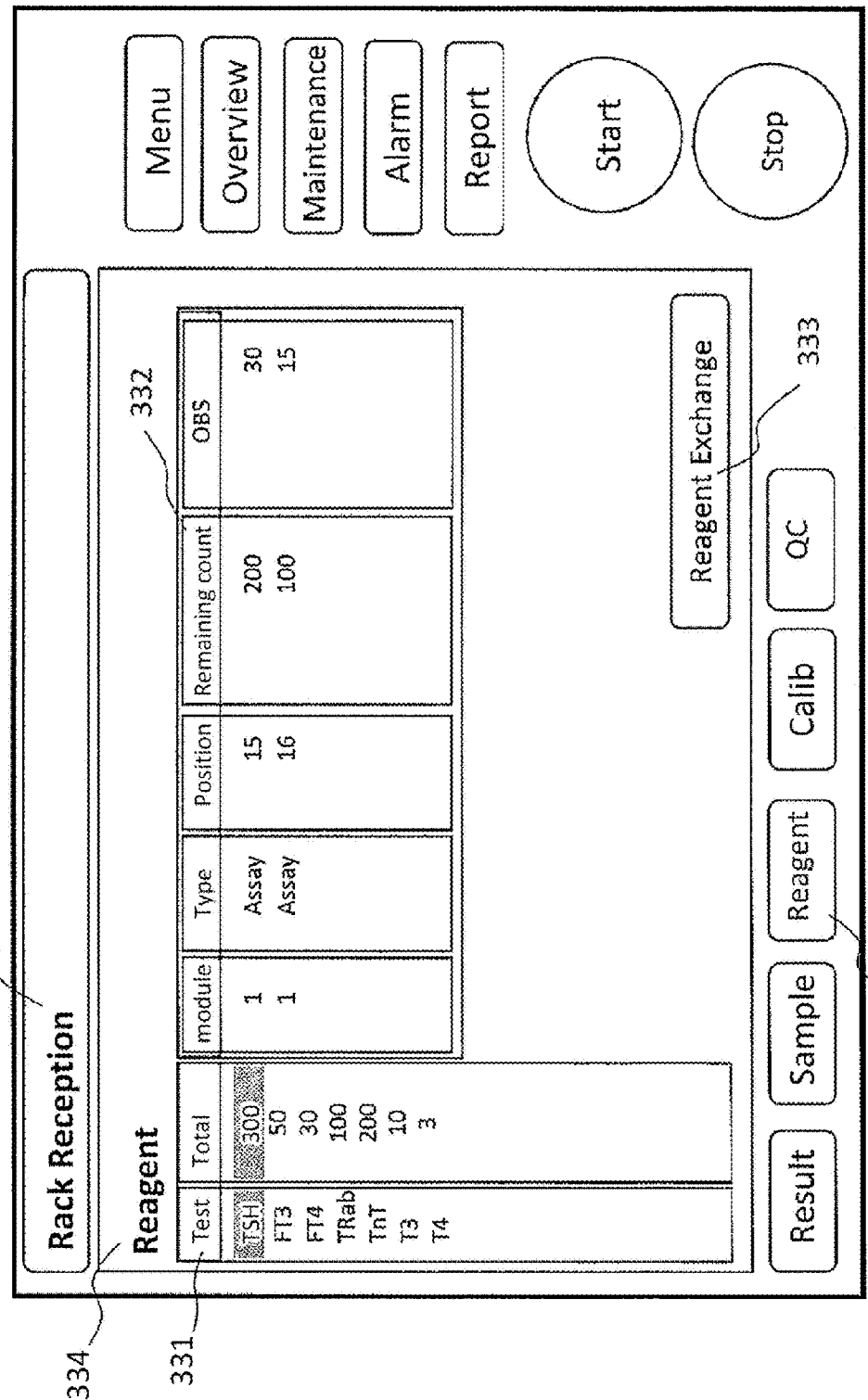
[FIG. 4]

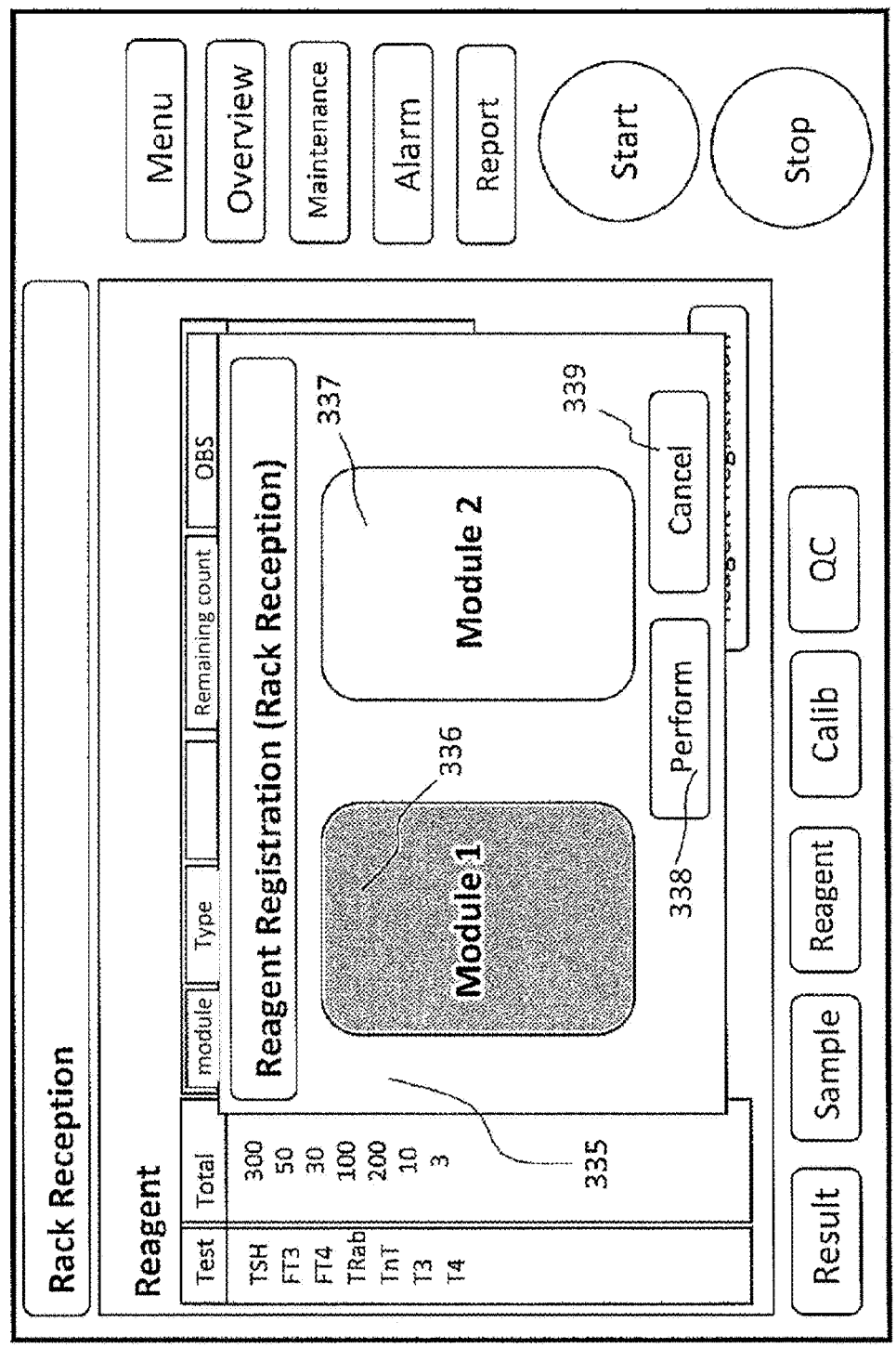
[FIG. 5]

[FIG. 6]
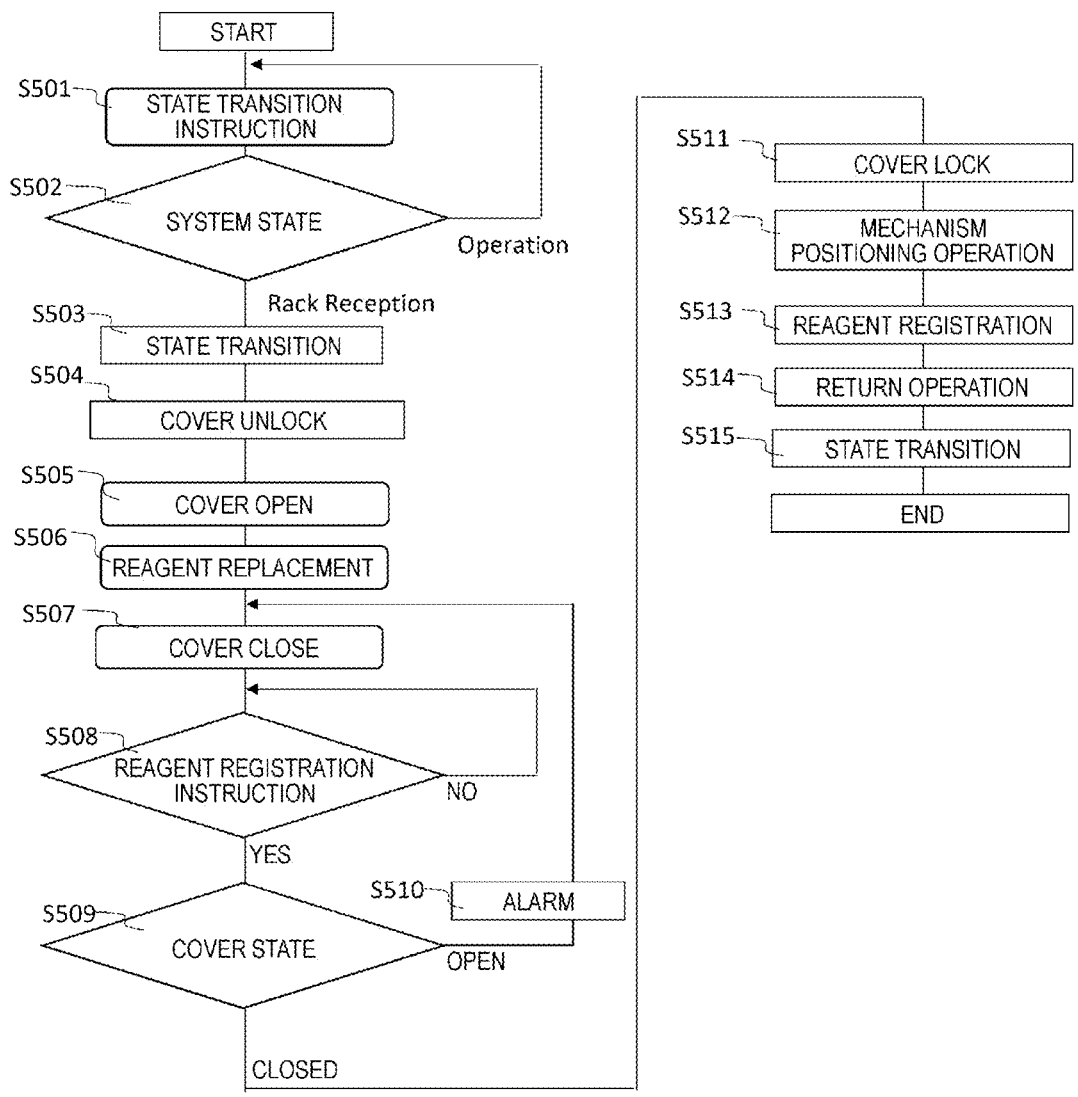

[FIG. 7]
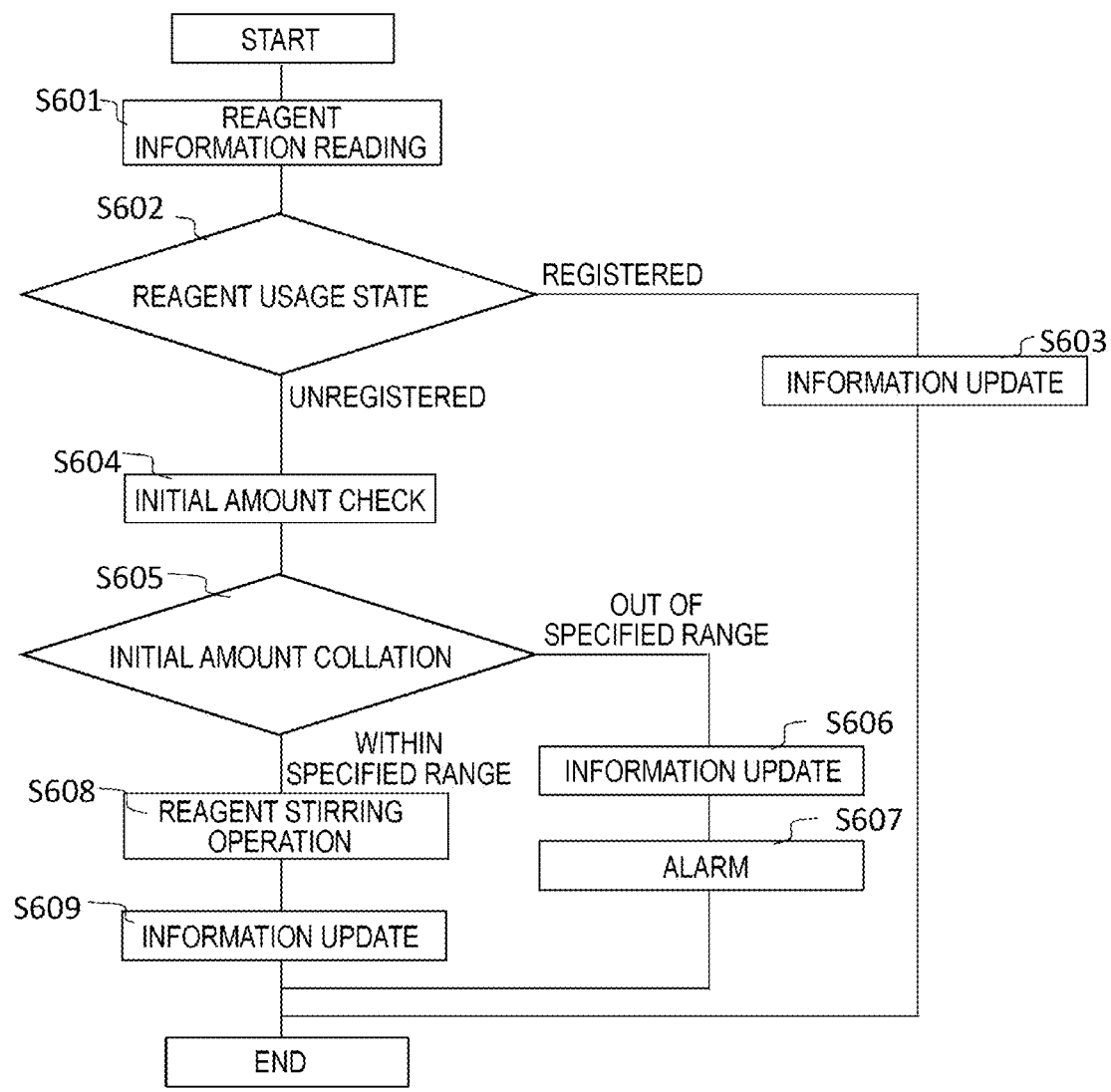

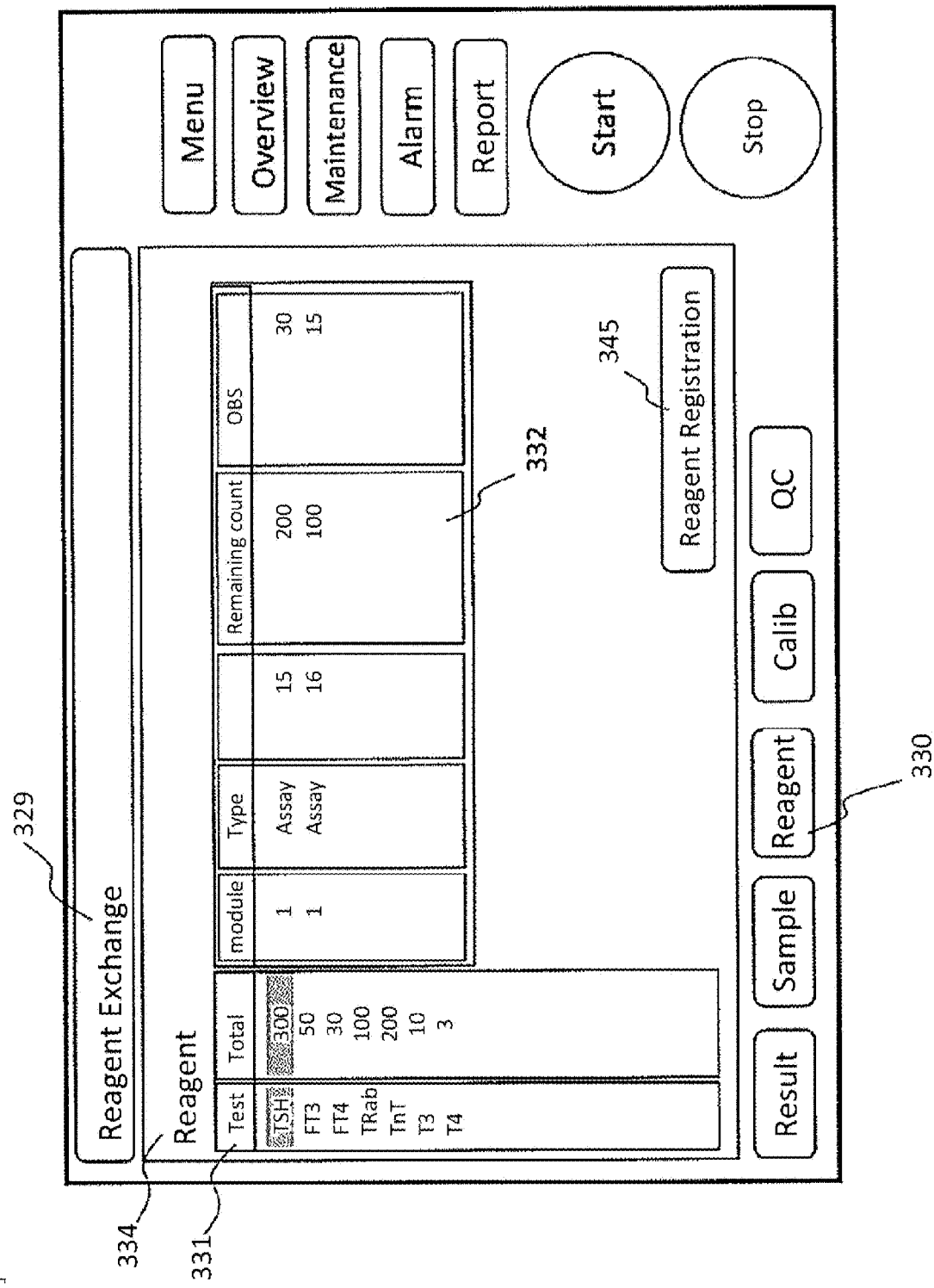
[FIG. 8]

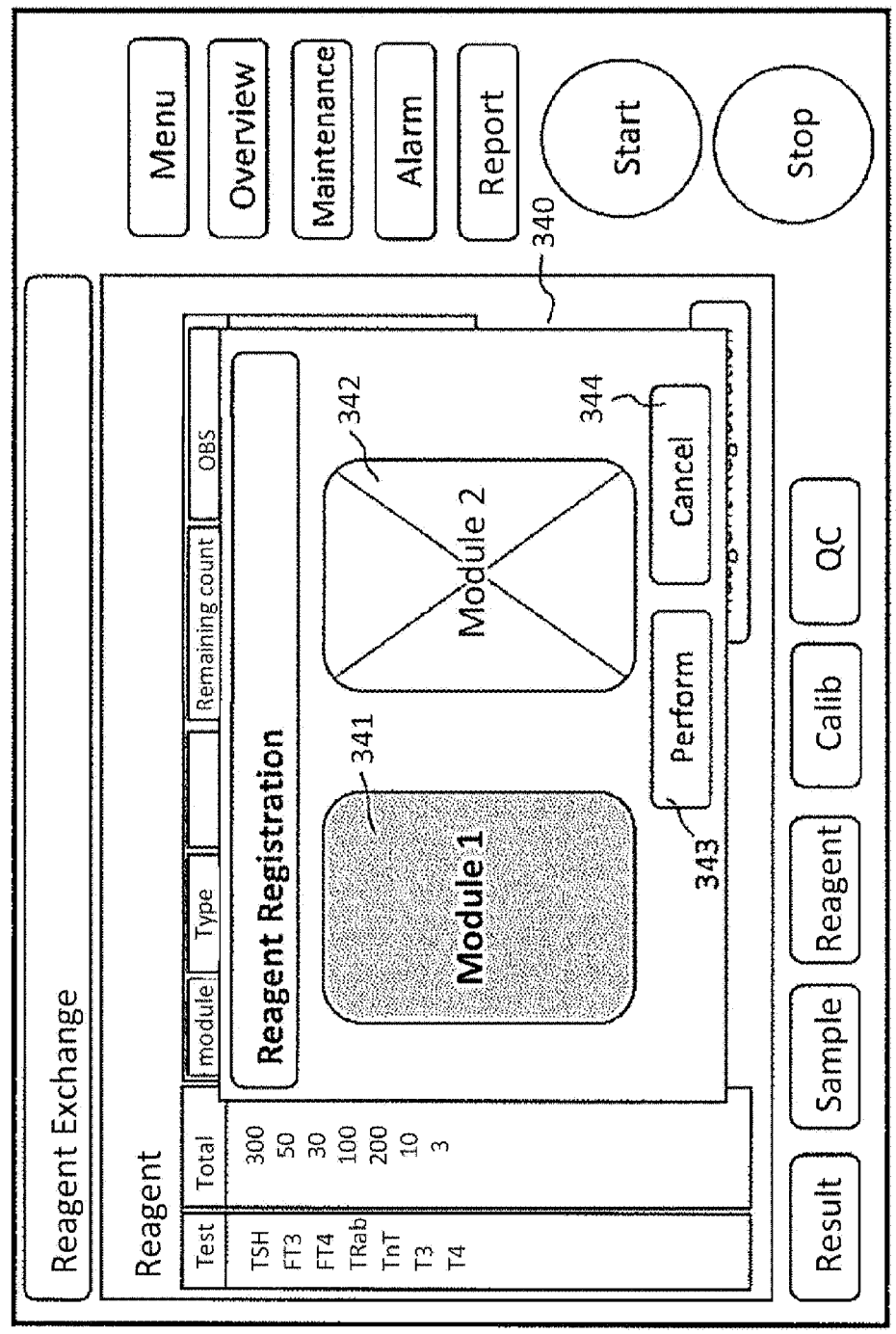
[FIG. 9]

AUTOMATIC ANALYZER

TECHNICAL FIELD

The present invention relates to an automatic analyzer.

BACKGROUND ART

Quantitative measurements on concentrations of chemical substances contained in body fluids such as blood, urine, such as proteins, lipids, sugar, ions and various components constituting these, are performed at clinical sites. An automatic analyzer is known as an analyzer for automating processes necessary for these measurements (for example, quantitative allocation of a specimen aliquot, mixing the aliquot with a reagent, determination of a reaction result, measurement of a change in a substance contained in a reagent, and the like).

In the general automatic analyzer in the related art, when a remaining amount of a reagent used for the analysis is insufficient during an analysis operation, it is necessary for an operator to perform exchange work of a reagent container after the analysis operation is completed and the analyzer is caused to temporarily transition to a standby mode. In contrast, an automatic analyzer disclosed in PTL 1 includes an autoloader mechanism for enabling exchange of a reagent container without hindering an analysis operation. Further, an automatic analyzer disclosed in PTL 2 is configured to automatically or manually interrupt an analysis operation and transition to a state in which an operator can exchange a reagent container when a remaining amount of a reagent becomes equal to or less than a certain amount.

In the analyzer described in PTL 1, since the autoloader mechanism is added, there is a problem that a size of the automatic analyzer is increased and cost is increased. In a technique described in PTL 2, since the analysis operation is interrupted and the reagent exchange is performed, there is a possibility that the analysis is interrupted and analysis of a specimen is delayed more than usual even when there is a specimen which is irrelevant to the analysis using the reagent and needs to be rapidly performed. In addition, since an operator can perform reagent exchange work, it may be necessary to wait for state transition of the analyzer.

CITATION LIST

Patent Literature

PTL 1: JP2012-189611A
PTL 2: JP2008-249442A

SUMMARY OF INVENTION

Technical Problem

An object of the invention is to provide an automatic analyzer that allows an operator to perform exchange work of a reagent container without including a mechanism for reagent exchange such as an autoloader and without interrupting an analysis operation.

Solution to Problem

An automatic analyzer according to the invention includes: an analysis unit including a plurality of operation units for performing analysis of a specimen; and a control unit configured to control the analysis unit.

The control unit is configured to allow the analysis unit to set to at least (a) an analysis operation mode in which a first operation unit and a second operation unit are operated for the analysis of the specimen, (b) a partial operation mode in which only the first operation unit is continuously operated after the analysis of the specimen is completed in the analysis operation mode, and (c) a reagent exchange mode in which consumables containing a reagent are exchangeable in the analysis unit.

The control unit, in the partial operation mode, is configured to allow the analysis unit to shift from the partial operation mode to the reagent exchange mode, when receiving a state transition instruction.

Advantageous Effects of Invention

According to the invention, it is possible to provide the automatic analyzer that allows an operator to perform exchange work of a reagent container without including a mechanism for reagent exchange such as an autoloader and without interrupting an analysis operation.

BRIEF DESCRIPTION OF DRAWINGS

FIG. 1 is a perspective view illustrating an overall configuration of an automatic analyzer 201.
FIG. 2 is a plan view illustrating the overall configuration of the automatic analyzer 201.
FIG. 3 is a schematic view illustrating an operation of the automatic analyzer 201.
FIG. 4 is an example of a display screen of the automatic analyzer 201.
FIG. 5 is an example of the display screen of the automatic analyzer 201.
FIG. 6 is a flowchart illustrating the operation of the automatic analyzer 201.
FIG. 7 is a flowchart illustrating the operation of the automatic analyzer 201.
FIG. 8 is an example of the display screen of the automatic analyzer 201.
FIG. 9 is an example of the display screen of the automatic analyzer 201.

DESCRIPTION OF EMBODIMENTS

Hereinafter, embodiments will be described with reference to the accompanying drawings. In the accompanying drawings, functionally the same element may be represented by the same number. The accompanying drawings show embodiments and implementation examples consistent with principles of the disclosure, are for the understanding of the disclosure, and are not intended to be construed in a limiting sense. Descriptions in this specification are merely a typical example, and are not intended to limit the scope of the claims or application of the disclosure in any sense.

It is necessary to understand that the embodiments are described in sufficient detail for those skilled in the art to perform the disclosure, but other implementations and aspects are possible, and a configuration and a structure can be changed and various elements can be replaced without departing from the scope and the spirit of the technical idea of the disclosure. Therefore, the following description should not be construed as being limited to the embodiments.

In the following embodiments, an automatic analyzer will be described as an example. The automatic analyzer includes, for example, a biochemical automatic analyzer and an immunological automatic analyzer. However, the above automatic analyzer is an example of the invention, and the invention is not limited to the embodiments described below, and extensively includes an analyzer that makes a sample react with a reagent and analyzes the sample based on a reaction result. For example, the invention may include a mass spectrometer used for a clinical examination, a coagulation analyzer that measures a blood coagulation time, and the like. In addition, the invention may also be applied to a combined system that combines the mass spectrometer and the coagulation analyzer with the biochemical automatic analyzer and the immunological automatic analyzer, or an automatic analysis system to which these analyzers are applied.

FIG. 1 and FIG. 2 are schematic configuration views of an automatic analyzer 201 to which a consumable exchange method is applied.

In FIG. 1 and FIG. 2, the automatic analyzer 201 includes, for example, a rack transport unit 202 and an analysis unit 203. The rack transport unit 202 and the analysis unit 203 are controlled by a control unit 204, and an analysis result and the like obtained by the analysis unit 203 are recorded in a storage device 315 (for example, a hard disk drive (HDD), a solid state drive (SSD)). In addition, for example, an operation unit 205 through which an operator inputs various inputs and a display (display unit) 316 that performs various displays are provided in an upper portion of the rack transport unit 202.

The rack transport unit 202 includes a rack transport line 302 that transports a rack 303. The analysis unit 203 is configured to analyze a specimen container 304 installed in the rack 303. A plurality of (for example, two) analysis units 203 may be installed for one rack transport unit 202 and one control unit 204. As will be described below, the analysis unit 203 is switched among an analysis operation mode in which an operation for analyzing a specimen is performed, a rack reception mode in which a rack can be received without waiting time in order to return to the analysis operation mode, a reagent exchange mode in which a reagent can be exchanged in the analysis unit, a standby mode, and the like. In addition, the analysis unit 203 is also configured to be able to execute an initialization operation, a preparation operation, a finalization operation, and the like for shifting to the analysis operation mode, the rack reception mode, the reagent exchange mode, the standby mode, and the like. The rack reception mode is a mode (partial operation mode) in which only the operation of a part (first operation unit) of units in the analysis unit 203, such as an incubator 307 and/or a temperature adjusting unit of an auxiliary reagent feeding unit 317, is performed in order to return to the analysis operation mode without waiting time, and is a mode for preparing for additional specimen input after measurement of the specimen in the analysis unit 203 is completed. A mechanism to be operated in the rack reception mode can be appropriately changed.

In contrast, in the analysis operation mode, all parts (the first operation unit and a second operation unit) including the incubator 307 and the auxiliary reagent feeding unit 317 are in an operable state. As described above, since the rack reception mode limits an operation target in the analysis unit 203, an operation at the time of transition from the rack reception mode to the reagent exchange mode is made to have a shorter required time than that of an operation at the time of transition from the analysis operation mode to the standby mode, have a smaller number of required steps than those of the operation at the time of transition from the analysis operation mode to the standby mode, or satisfy both the shorter required time and the smaller number of required steps. In addition, an operation at the time of transition from the reagent exchange mode to the rack reception mode is also made to have a shorter required time than that of an operation at the time of transition from the standby mode to the analysis operation mode, have a smaller number of required steps than those of the operation at the time of transition from the standby mode to the analysis operation mode, or satisfy both the shorter required time and the smaller number of required steps.

The control unit 204 includes, for example, a hardware board, and is connected to a general-purpose computer. The operation unit 205 is implemented by, for example, the display unit 316 which is a display, and an input device such as a mouse and a keyboard. The storage device 315 stores, for example, a temperature range corresponding to each unit.

The control unit 204 may be implemented by hardware by a dedicated circuit board, or may be implemented by software executed by a computer connected to the automatic analyzer 201. When the control unit is implemented by hardware, such a configuration can be implemented by integrating, on a wiring board or in a semiconductor chip or a package, a plurality of calculators that execute processing. When the control unit is implemented by software, such a configuration can be implemented by mounting a high-speed general-purpose CPU on the computer and executing a program that executes desired calculation processing. An existing device can be upgraded by a recording medium on which the program is recorded. These devices, circuits, and computers are connected by a wired or wireless network, and appropriately transmit and receive data. In addition, the control unit 204 can be connected to a high-level system such as a clinical examination information system, and can transmit and receive examination information including a device state, consumable information, and measurement information.

The analysis unit 203 includes a rack transport unit 305 that causes the rack 303 transported from the rack transport unit 202 to move to the analysis unit 203, a reagent cold insulation unit 306, the incubator (reaction disk) 307, a sample dispensing mechanism (aliquot dispensing mechanism) 308, a reagent dispensing mechanism 309, a consumables transport unit 310, the auxiliary reagent feeding unit 317, and a detection unit 311. Each of the above components may be referred to as a unit. In addition, the analysis unit 203 includes a cover 319 on an upper surface thereof and a lock mechanism 320 that locks opening and closing of the cover 319.

The rack 303 houses a plurality of specimen containers 304 (aliquot container) each storing a biological sample (sample) such as blood or urine. The rack 303 is transported on the rack transport line 302 and the rack transport unit 305 in a state in which the specimen container 304 is housed.

The reagent cold insulation unit 306 is a housing container as a storage unit of a reagent container. The reagent cold insulation unit 306 is a unit for housing and cooling a plurality of reagent containers 313 storing various reagents used for sample analysis. The reagent cold insulation unit 306 includes a reagent disk rotatably disposed therein, and can house the reagent containers 313 in a plurality of reagent container housing units disposed on the reagent disk.

The reagent cold insulation unit 306 includes a reagent information reading unit (not shown). The reagent information reading unit is configured to be able to read information (hereinafter referred to as reagent information) for specifying at least the type of reagent, which is stored in a recording medium (for example, an RFID tag) or a barcode attached to each of the reagent containers 313.

As shown in FIG. 2, at least a part of an upper surface of the reagent cold insulation unit 306 is covered with a reagent disk cover 327, and a part of the reagent disk cover 327 is attached so as to be easily openable and closable so that an operator can exchange the reagent containers 313. The reagent disk cover 327 is partially provided with an opening through which a nozzle of the reagent dispensing mechanism 309 to be described later can pass.

In addition, the reagent cold insulation unit 306 may include an indicator 326 that indicates whether each of the reagent containers 313 can be exchanged by an operator by the reagent cold insulation unit 306. The indicator 326 is implemented by, for example, a lamp, and an LED, and may indicate a state of the reagent cold insulation unit 306 by color of the lamp and the LED, and the indicator 326 is implemented by a liquid crystal display, and may indicate a state by a displayed character.

The incubator 307 is a mechanism that causes a sample to react with a reagent in a reaction container 314. The incubator 307 includes a reaction container disposing unit in which a plurality of reaction containers 314 are disposed, and a temperature adjustment mechanism that adjusts temperature of each of the reaction containers 314 to a desired temperature. The reaction container disposing unit is configured to be rotatable about a rotation axis.

The sample dispensing mechanism 308 is configured to aspirate a sample from the specimen container 304 and discharge the sample toward the reaction container 314 disposed in the incubator 307. The sample dispensing mechanism 308 includes a rotation drive mechanism that rotates the rotation axis, a vertical drive mechanism, a nozzle that aspirates liquid, and a syringe serving as a pressure source. The sample can be dispensed, by the rotation drive mechanism and the vertical drive mechanism, from the specimen container 304 to the reaction container 314 stored in the incubator 307. In addition, the sample dispensing mechanism 308 further includes a cleaning tank (not shown) for cleaning the nozzle.

In addition, the reagent dispensing mechanism 309 is configured to be rotatable and vertically movable around a rotation axis, and is configured to aspirate a reagent held in each of the reagent containers 313 in the reagent cold insulation unit 306 and discharge the aspirated reagent to the reaction container 314 on the incubator 307. The reagent dispensing mechanism 309 also includes the rotation drive mechanism, the vertical drive mechanism, the nozzle for aspirating liquid, and the syringe serving as a pressure source, which are similar to those of the sample dispensing mechanism 308. The reagent dispensing mechanism 309 further includes the cleaning tank (not shown) for cleaning the nozzle. The reagent dispensing mechanism 309 further includes a stirrer (not shown) for stirring the reagent in each of the reagent containers 313.

The consumables transport unit 310 stores and transports consumables used for analysis, for example, the reaction container 314, a dispensing tip Cd, and the like. The reaction container 314 and the dispensing tip Cd are transported to the incubator 307 and the sample dispensing mechanism 308 by using a transporting mechanism that can be driven in X, Y, and Z directions from an area where the reaction container 314 and the dispensing tip Cd are stored. In addition, since consumables used for analysis are exchanged or replenished by an operator, the consumables may be mounted at a position accessible by the operator at all times, or may be mounted at a position where access is restricted by the cover 319 and the lock mechanism 320.

Further, the consumables transport unit 310 may include an indicator 323 that indicates whether the consumables transport unit 310 itself can be exchanged with the reaction container 314 or the dispensing tip Cd by an operator. The indicator 323 is provided on an outer wall of a front surface of the analysis unit 203 in FIG. 1, but the position thereof is not limited. For example, the indicator 323 may indicate a state by the color of a lamp or an LED, and indicate a state by a character on the liquid crystal display.

The auxiliary reagent feeding unit 317 stores and feeds an auxiliary reagent necessary for analysis, for example, cleaning liquid for cleaning a flow path in the detection unit 311, a nozzle of the sample dispensing mechanism 308, and a nozzle of the reagent dispensing mechanism 309, and a trigger reagent necessary for a light emission reaction for detection. The auxiliary reagent is stored in a reagent bottle 318 and stored in the auxiliary reagent feeding unit 317. The reagent bottle 318 is connected to a flow path connected to a syringe 325 serving as a pressure source, and liquid is fed to a target position.

A plurality of sets of auxiliary reagent feeding units 317 may be provided, and a plurality of reagent bottles 318 may be connected to one syringe 325. The auxiliary reagent feeding unit 317 has a function of adjusting temperature of the auxiliary reagent, and can be configured to feed liquid by adjusting temperature of a target reagent according to a feeding position. Since the reagent bottle 318 is exchanged or replenished by an operator, the reagent bottle 318 may be mounted at a position accessible by the operator at all times, or may be mounted at a position where access is restricted by a lock mechanism 322. The auxiliary reagent feeding unit 317 may include an indicator 324 indicating whether the auxiliary bottle or the like can be exchanged by the operator. The indicator 324 is implemented by, for example, a lamp, and an LED, and may indicate a state by color of the lamp and the LED. In addition, the indicator 324 is implemented by a liquid crystal panel or the like, and may indicate a state by a character.

The detection unit 311 receives supply of reaction solution from the reaction container 314 via a reaction liquid aspiration mechanism 311a and executes aliquot analysis. The detection unit 311 includes a detector such as a photomultiplier tube, a light source lamp, a spectrometer, or a photo diode, detects light associated with a light emission reaction, and analyzes the reaction solution.

As described above, the analysis unit 203 includes the cover 319 on the upper surface thereof. The cover 319 covers at least a part of the analysis unit 203 including the reagent cold insulation unit 306 and the consumables transport unit 310 so that an operator does not come into contact with movable units of the sample dispensing mechanism 308 and the reagent dispensing mechanism 309 while a mechanism unit such as the sample dispensing mechanism 308 and the reagent dispensing mechanism 309 is operating. In addition, the lock mechanism 320 is provided to prevent the cover 319 from being opened during operation of the mechanism unit. Further, the cover 321 is configured to be able to cover at least the auxiliary reagent feeding unit 317. The cover 321 includes the lock mechanism 322 in order to prevent the cover 321 from being opened during the operation of the mechanism unit in the auxiliary reagent feeding unit 317. The covers 319 and 321 may include sensors capable of detecting open and closed states of the covers 319 and 321, respectively.

Next, operations of the present embodiment will be described with reference to FIG. 3. The automatic analyzer 201 according to the present embodiment executes a reagent exchange mode in which reagent exchange is performed without including an additional mechanism for the reagent exchange such as an autoloader and without interrupting an analysis operation, and enables an operator to perform exchange work of a reagent container. The operations including the reagent exchange mode will be described below. FIG. 3 shows a state transition of the automatic analyzer 201 for each of a plurality of analysis units. Here, a case where there are two analysis units 203 (a first analysis unit and a second analysis unit) and the analysis operation is individually executed in each of the analysis units 203 will be described as an example.

After power is turned on, the automatic analyzer 201 executes an initialization operation (Initialize) 401. In the initialization operation 401, a water exchange operation in a flow path and a mechanism check operation are performed. At this time, since each mechanism unit such as the sample dispensing mechanism 308 and the reagent dispensing mechanism 309 is operating, the cover 319 cannot be opened by the lock mechanism 320. Further, at this time, the control unit 204 controls the indicators 323, 324, and 326 to display that each consumable is in an unexchangeable state.

When the initialization operation 401 is completed, the automatic analyzer 201 transitions to the standby mode (standby state) (Standby) 402. The standby mode is a state in which all the mechanism units of the automatic analyzer 201 stop operating. Therefore, the control unit 204 sets the lock mechanisms 320 and 322 into an unlocked state and sets the covers 319 and 321 into an openable and closable state. An operator can exchange and replenish consumables such as the reaction container 314, the dispensing tip Cd, the reagent container 313, and the reagent bottle 318 during the standby mode. At this time, the control unit 204 controls the indicators 323, 324, and 326 to display that each consumable is in an exchangeable state.

When a measurement start request is input from the operation unit 205 by the operator, the automatic analyzer 201 transitions to a preparation mode (Preparation) 403. At this time, the control unit 204 locks the lock mechanisms 320 and 322, and sets the covers 319 and 321 into an unopenable state. Further, the control unit 204 controls the indicators 323, 324, and 326 to display that each consumable is not in the exchangeable state. In addition, when the open and closed state of the cover 319 is checked at the time of transition, and it is detected that the cover 319 is open, the automatic analyzer 201 does not transition to the preparation mode 403.

In the preparation mode 403, for example, an operation check of each mechanism, filling and exchange of the auxiliary reagent on the flow path, an air bleeding operation in the syringe or the flow path, a quantity check of consumables, an output check of the detector in the detection unit 311, and the like are performed.

After the preparation mode 403 is completed, the automatic analyzer 201 transitions to an analysis operation mode 404. At this time, the rack transport unit 202 transports the rack 303 to the rack transport unit 305 in the analysis unit 203 via the rack transport line 302. Thereafter, the sample dispensing mechanism 308 aspirates a sample from the specimen container 304 installed in the rack 303, and discharges the sample to the reaction container 314 transported onto the incubator 307 by the consumables transport unit 310.

Thereafter, the sample dispensing mechanism 308 cleans the nozzle using water or a cleaning liquid fed from the auxiliary reagent feeding unit 317 in a cleaning tank provided in the sample dispensing mechanism 308. The cleaning may be performed every time dispensing is performed, or may be performed when a sample to be dispensed is changed. In addition, the nozzle in the sample dispensing mechanism 308 may perform a dispensing operation in a state in which a dispensing tip is mounted. In this case, the dispensing tip Cd transported from the consumables transport unit 310 before dispensing is mounted.

Next, the reagent dispensing mechanism 309 aspirates a reagent from each of the reagent containers 313 cooled and stored in the reagent cold insulation unit 306, and discharges the reagent to the reaction container 314 already dispensed with the sample or the empty reaction container 314 on the incubator 307. When the reagent is discharged to the empty reaction container 314, the above dispensing operation of the sample is performed thereafter.

The reagent dispensing mechanism 309 cleans the nozzle using water or a cleaning liquid fed from the auxiliary reagent feeding unit 317 in a cleaning tank provided in the reagent dispensing mechanism 309. The cleaning may be performed every time dispensing is performed, or may be performed when a reagent to be dispensed is changed. In addition, a remaining amount of the reagent in each of the reagent containers 313 is stored in the storage device 315 in the control unit 204, and the remaining amount is updated every dispensing.

Next, the detection unit 311 aspirates mixed solution from the reaction container 314 into which a reagent and a sample are dispensed and in which a reaction between the reagent and the sample is performed for a certain period of time on the incubator 307, and performs the analysis operation by the detector (analysis operation mode 404). At this time, the auxiliary reagent fed from the auxiliary reagent feeding unit 317 promotes the light emission reaction. After the analysis operation is completed, the inside of the detection unit 311 is cleaned using water or a cleaning liquid fed from the auxiliary reagent feeding unit 317.

When the analysis operation mode 404 is completed, the analysis unit 203 appropriately shifts to a rack reception mode 405 in which the rack 303 can be received. The rack reception mode 405 is a state in which the analysis unit 203 can be immediately shifted to the analysis operation mode 404 in response to a measurement start instruction. Therefore, each unit periodically performs an analysis maintaining operation necessary for each unit in order to maintain a state in which the unit can shift to the analysis operation mode 404. For example, in order to keep temperature within a certain range, the incubator 307 also executes a temperature equalizing operation equivalent to the operation of the incubator 307 in the analysis operation mode 404 in the rack reception mode 405. In order to maintain the temperature of the auxiliary reagent, the auxiliary reagent feeding unit 317 performs a feeding operation when a certain period of time has elapsed after transition to the rack reception mode 405. For the other various units, in order to be able to immediately resume measurement when a request for the measurement is received from the control unit 204, the analysis maintaining operation necessary for each unit is periodically performed after the transition to the rack reception mode 405. The analysis maintaining operation may be operated by the incubator 307 alone, or may be operated by the auxiliary reagent feeding unit 317 alone. In addition, a plurality of units including the incubator 307 and the auxiliary reagent feeding unit 317 may simultaneously perform the analysis maintaining operation.

Relation between the analysis operation mode 404 and the rack reception mode 405 will be described. Here, an example in which the automatic analyzer 201 includes two analysis units 203 (the first analysis unit and the second analysis unit) will be described.

From the initialization operation 401 to the start of the analysis operation mode 404, the automatic analyzer 201 and the analysis unit 203 maintain the same device state. However, after the automatic analyzer 201 transitions to the analysis operation mode 404, the state of the automatic analyzer 201 is determined according to a combination of states of the two analysis units 203 (the first analysis unit and the second analysis unit).

Since the automatic analyzer 201 includes the two analysis units 203, when one of the analysis units 203 is in the state of the analysis operation mode 404, the state of the automatic analyzer 201 is also in the analysis operation mode 404. Only when both of the two analysis units 203 enter the rack reception mode 405, the automatic analyzer 201 also transitions to the rack reception mode 405.

In the illustrated example, the second analysis unit completes the analysis operation mode 404 earlier than the first analysis unit, but the automatic analyzer 201 shifts to the rack reception mode 405 for the first time at a stage where the analysis operation mode 404 is completed even in the first analysis unit and both the first analysis units and the second analysis unit complete the analysis operation mode 404, and becomes a state in which the state transition instruction can be received. The state transition instruction indicates transition to a state (reagent exchange mode 406) in which an operator can exchange each of the reagent containers 313, and may be input from the operation unit 205.

When the state transition instruction is input, the analysis unit (the second analysis unit in the illustrated example) related to the state transition instruction shifts from the rack reception mode 405 to the reagent exchange mode 406. As a special operation performed at the time of the transition from the rack reception mode 405 to the reagent exchange mode 406, a part of a finalization operation (Finalization) or an additional operation not included in the finalization operation (Finalization) to be described later is performed. As the additional operation, the control unit 204 may retract at least one of drive mechanisms (for example, the reagent dispensing mechanism 309) that may become an obstacle when an operator accesses the reagent cold insulation unit 306 to a position where a user is physically inaccessible or is more difficult to access. The special operation is configured to be completed in a shorter time than a time required for the finalization operation (Finalization). In the reagent exchange mode 406, the analysis maintaining operation of each unit operating in the rack reception mode 405 is temporarily completed. However, a temperature adjustment function of the incubator 307 and the auxiliary reagent feeding unit 317 may continue to operate alone or at the same time. When the reagent exchange mode 406 is completed, a reagent registration mode 407 to be described later is executed, and then the second analysis unit returns to the rack reception mode 405. At the time of returning (transitioning) from the reagent exchange mode 406 to the rack reception mode 405, a part of the operation of the transition may be omitted based on information of various sensors (not shown) or information of an RFID tag in a consumable including a reagent container. Alternatively, a part of the operation of the transition to the rack reception mode 405 may be omitted based on an elapsed time after transition to the reagent exchange mode 406.

After returning to the rack reception mode 405, in accordance with an instruction from an operator, the automatic analyzer 201 can return to the analysis operation mode 404, or can shift to the standby mode (Standby) 402 via the finalization operation (Finalization) as shown in FIG. 3. As described above, in the rack reception mode 405, since temperature of each unit is maintained and the mechanism unit also continues to operate so that the automatic analyzer 201 can immediately shift to the analysis operation mode 404, the automatic analyzer 201 can return to the analysis operation mode 404 without substantial waiting time.

In contrast, when the automatic analyzer 201 shifts from the rack reception mode 405 to the standby mode 402 without returning to the analysis operation mode 404, the finalization operation (Finalization) is executed. The finalization operation in this case includes only a part of the finalization operation (Finalization 408) that needs to be performed at the time of transition from the state of the analysis operation mode 404 to the standby mode 402. For example, only water exchange of an auxiliary reagent supply flow path, a cleaning operation of various nozzles, backup of information in the storage device 315, unlocking of the lock mechanism, stopping of an operation of a mechanism, and the like are executed.

An example of screens of the operation unit 205 for instructing transition to the reagent exchange mode 406 and the display 316 in the rack reception mode 405 will be described with reference to FIG. 4. FIG. 4 shows a measurement information display screen 334 indicating information on an executable measurement, which is displayed on the display 316.

A state display unit 329 displays the state of the automatic analyzer 201, that is, a name of a mode being executed (for example, "Rack Reception"). By looking at the display of "Rack Reception", an operator can confirm that the automatic analyzer 201 is in a state capable of transitioning to the reagent exchange mode 406.

The operator can move from the other display screen to the measurement information display screen 334 by selecting a "Reagent" button 330 on the display 316 using a touch panel, a mouse, or the like. An overview screen 331 on the left of the measurement information display screen 334 displays names of measurement items executable by the automatic analyzer 201 and the number of remaining usable tests.

When a certain measurement item is selected from the overview screen 331 (for example, when "TSH" is selected), information of the reagent container necessary for executing the selected measurement item is displayed on a detail screen 332 (for example, a type (Type) of the reagent container, a position (Position) in the reagent cold insulation unit 306 where each of the reagent containers 313 is mounted, a remaining amount (Remaining count) of each reagent container, an expiration date (OBS: date when the reagent can be used in the device), and the like).

Further, a reagent exchange mode (Reagent Exchange) button 333 for instructing the transition from the rack reception mode 405 to the reagent exchange mode 406 is displayed on the overview screen 331. The reagent exchange mode button 333 may be displayed only in a state in which the automatic analyzer 201 is in the rack reception mode 405, or may be displayed in a state other than the rack reception mode 405. When the reagent exchange mode button 333 is pressed in the state other than the rack reception mode 405, an alarm is output.

When the reagent exchange mode button 333 is pressed in a state in which the automatic analyzer 201 is in the rack reception mode 405, the control unit 204 displays an analysis unit selection screen 335 shown in FIG. 5 on the display 316. The analysis unit selection screen 335 shown in FIG. 5 may be displayed on the measurement information display screen 334 or may be displayed on the entire display 316.

On the analysis unit selection screen 335, a "Module 1" button 336 and a "Module 2" button 337 corresponding to the analysis unit 203 for exchanging the reagent containers 313 are displayed. The operator selects the button 336 or 337 corresponding to the analysis unit for which the reagent container is desired to be exchanged, and presses a "Perform" button 338. Accordingly, the automatic analyzer 201 transitions to the reagent exchange mode 406 in the selected first analysis unit or second analysis unit. To return to the measurement information display screen 334, a Cancel button 339 is pressed.

When the Perform button 338 is pressed, the control unit 204 changes display of the operation unit 205 from the analysis unit selection screen 335 to the measurement information display screen 334 again. In the present embodiment, since an example in which the reagent container of one of the first analysis unit and the second analysis unit constituting the automatic analyzer 201 is exchanged will be described, only one analysis unit can be selected on the analysis unit selection screen 335. However, a plurality of analysis units may be selected on the analysis unit selection screen 335, and reagent containers may be exchanged at the same time.

Detailed execution procedures of the reagent exchange mode 406 and the reagent registration mode 407 will be described with reference to a flowchart of FIG. 6. When the control unit 204 receives a state transition instruction from an operator (step S501), the control unit 204 confirms the state of the automatic analyzer 201 (step S502). At this time, when the state of the automatic analyzer 201 is the analysis operation mode 404 (when any of the plurality of analysis units 203 is in the analysis operation mode), the state transition instruction is not received (the reception is rejected), and the operation returns to step S501. In contrast, when the state of the automatic analyzer 201 is the rack reception mode 405, the state transition instruction is received, and the operation proceeds to step S503.

In step S503, the control unit 204 sets a state of a target analysis unit 203 to the reagent exchange mode 406. At this time, the control unit 204 instructs the analysis unit 203 to perform an operation necessary for the state transition. The analysis unit 203 executes a state transition operation including at least unlocking of the lock mechanism 320 and stopping of operations of all mechanisms (step S504).

When the lock mechanism 320 is unlocked, a state in which the operator can exchange the reagent containers 313 in the reagent cold insulation unit 306 is obtained. At this time, the control unit 204 controls each indicator 326 in accordance with a state of the lock mechanism 320 to display an exchangeable state of the reagent and each consumable.

At this time, the control unit 204 also unlocks both or one of the lock mechanism 320 and the lock mechanism 322, and controls the indicator 323 and the indicator 324 to display whether the exchange can be allowed corresponding to the respective locked/unlocked states. The reagent bottle 318 in the auxiliary reagent feeding unit 317, the reaction container 314 in the consumables transport unit 310, or the dispensing tip Cd may be exchangeable.

Next, the operator opens the unlocked cover 319 and replenishes or exchanges the reagent containers 313 in the reagent cold insulation unit 306 (step S505 and step S506). After the exchange, the operator closes the cover 319 (step S507), and causes the control unit 204 to perform a reagent registration instruction via the operation unit 205 (step S508). The reagent registration instruction is an instruction to perform a reagent registration operation of registering information on the replenished or exchanged reagent in the automatic analyzer 201.

When receiving the reagent registration instruction, the control unit 204 causes the analysis unit 203 to transition to the reagent registration mode 407. Thereafter, the control unit 204 checks the open and closed state of the cover 319, and outputs an alarm when the cover 319 is open to prompt the operator to close the cover 319 (step S510).

After confirming that the cover 319 is closed, the control unit 204 locks at least the lock mechanism 320 (step S511), and performs a positioning operation of each mechanism unit (step S512). Thereafter, the control unit 204 performs the reagent registration operation (step S513). After the reagent registration is completed (step S513), the control unit 204 performs a return operation and a state transition operation for causing the state of the analysis unit 203 to transition to the analysis operation mode 404 or the rack reception mode 405 (steps S514 and S515).

In the return operation, only a part of or a simplified operation of the operation executed in the preparation mode 403 executed at the time of shifting from the standby mode 402 to the analysis operation mode 404 is executed. The operation is, for example, the positioning operation of a mechanism, the filling or exchange of the auxiliary reagent into the flow path, or the output check of the detector in the detection unit 311. The positioning operation of the mechanism, the filling or exchange of the auxiliary reagent into the flow path, and the output check of the detector in the detection unit 311 may be simplified according to a purpose of each operation without performing a part of operation content performed in the preparation mode 403.

Therefore, the return operation is configured to be completed in a shorter time than a time required for the preparation mode 403. When the return operation is completed, the control unit 204 causes the state of the analysis unit 203 to transition to the analysis operation mode 404 or the rack reception mode 405. When an error occurs in step S514 (for example, when the mechanism cannot be moved to a home position by the positioning operation of the mechanism), the transition to the analysis operation mode 404 or the rack reception mode 405 is stopped, and the transition to the standby mode 402 is performed.

In contrast, when an error that can be returned by the operator occurs in step S514, the transition to the analysis operation mode 404 or the rack reception mode 405 may be temporarily stopped, and then the error may be resolved by the operator, and the transition operation may be performed again. For example, when a remaining amount of the consumables is less than the minimum amount in the check of the consumables, after the transition to the analysis operation mode 404 or the rack reception mode 405 is stopped, the consumables are replenished by the operator, and then the step S514 can be performed again to transition to the analysis operation mode 404 or the rack reception mode 405.

Content of the return operation may be changed according to a time from the transition from the rack reception mode 405 to the reagent exchange mode 406 to the transition to the analysis operation mode 404 or the rack reception mode 405 again. For example, since evaporation or dilution of the auxiliary reagent does not occur in a short time, the filling and exchange of the auxiliary reagent on the flow path can be skipped.

Detailed procedures of the reagent registration operation (step S513) described in FIG. 6 will be described with reference to a flowchart of FIG. 7.

In the reagent registration operation (step S513), the control unit 204 first reads reagent information (step S601). The control unit 204 rotates a reagent disk of the reagent cold insulation unit 306 to move each reagent container 313 housed in the reagent container housing unit to the vicinity of the reagent information reading unit (not shown), whereby the reagent information is read from storage media attached to the reagent containers 313.

Next, the control unit 204 determines whether each reagent container 313 housed in the reagent container housing unit is registered in another analysis unit or automatic analyzer including the analysis unit 203 based on the reagent information read in step S601 and information recorded in the storage device 315 (step S602).

When it is determined as "registered" in step S602, the information in the storage device 315 is updated (step S603), and the registration operation is completed. In contrast, when it is determined as "unregistered" in step S602, the control unit 204 controls the reagent dispensing mechanism 309 to check an initial amount of the reagent in each reagent container 313 related to the reagent registration (step S604). At this time, the reagent dispensing mechanism 309 calculates a reagent amount in the reagent container using a liquid level detection function of a nozzle (step S605).

Then, the calculated reagent amount is compared with a prescribed value of an initial amount stored in advance in the storage device 315, and it is determined whether the calculated reagent amount is within a prescribed range. Only in the case of being within the prescribed range, the registration operation is continued. When it is determined that the calculated reagent amount is out of the prescribed range, it is recorded in the storage device 315 that the reagent container cannot be registered (step S606), an alarm is output, and the registration operation is completed (step S607).

When it is determined that the initial amount is within the prescribed range, the control unit 204 stirs the reagent using a stirrer (not shown) in the reagent dispensing mechanism 309 (step S608). After the stirring is completed, the information in the storage device 315 is updated, and the registration operation is completed (step S609).

FIG. 8 shows an example of the measurement information display screen 334 in the reagent exchange mode 406. "Reagent Exchange" indicating the reagent exchange mode is displayed in the state display unit 329.

In this state, the operator presses a "Reagent Registration" button 345 for the reagent registration mode in order to cause the automatic analyzer 201 to perform the reagent registration instruction. When the "Reagent Registration" button 345 is pressed, the control unit 204 causes the display 316 to display a reagent registration reception screen 340 shown in FIG. 9.

The reagent registration reception screen 340 may be displayed on the measurement information display screen 334 or may be displayed on the entire operation unit 205. In the reagent registration reception screen 340, a Module 1 button 341 and a Module 2 button 342 similar to those in the analysis unit selection screen 335 are displayed. Among the Module 1 button 341 and the Module 2 button 342, only the button (the Module 1 button 341 in FIG. 9) corresponding to an analysis unit selected on the analysis unit selection screen 335 is displayed in a selected state (inverted display), and the Module 2 button 342 is in an unselectable state. The operator confirms that the Module 1 button 341 has been selected, and presses a Perform button 343 to start the reagent registration operation. When a Cancel button 344 is pressed, the control unit 204 causes the operation unit 205 to redisplay the measurement information display screen 334.

When a plurality of analysis units are selected on the analysis unit selection screen 335, all the analysis units selected on the analysis unit selection screen 335 are in a selected state (both the Module 1 button 341 and the Module 2 button are displayed inverted). When the operator completes the exchange of the reagent containers 313 and enters a state in which the reagent registration may be performed, the control unit 204 starts a process of the reagent registration when the Perform button 343 is pressed.

As described above, according to the present embodiment, after the analysis operation mode 404 is completed, the analysis unit 203 sets the rack reception mode in which the rack 303 can be received from the rack transport unit 202 without waiting time in order to return to the analysis operation mode. Only when the rack reception mode is set, the control unit 204 controls the analysis unit 203 so as to be able to shift to the reagent exchange mode 406 for executing the reagent exchange. As described above, when the operator exchanges the consumables including the reagent container, a specially-developed reagent exchange mode (Reagent Exchange) that performs only exchange of the consumables including the reagent container may be selectable, and thus it is not necessary to perform a part of the operation required when normal consumables are caused to transition to the exchangeable state, and it is possible to shorten a time required for exchanging the consumables and resuming the measurement.

In the above embodiment, an example has been described in which, when all the analysis units constituting the automatic analyzer 201 enter the rack reception mode 405, the state transition instruction can be received, and shifting to the reagent exchange mode can be performed. However, the reagent exchange mode may be performed in a state in which all the analysis units are not in the rack reception mode and a target analysis unit is in the rack reception mode. The reagent containers of a plurality of analysis units may be exchanged at the same time.

Further, in the above embodiment, an example has been described in which, the rack 303 can be received from the rack transport unit 202, but the invention is not limited to the analyzer using the rack. For example, the invention can also be applied to an analyzer in which a specimen container is directly transported by a robotic arm, or an analyzer in which a user directly installs a specimen container in a position where a specimen is aspirated.

Further, an automatic analyzer in which a reagent container is mounted in the analyzer may be an immunological automatic analyzer, a biochemical automatic analyzer, or a blood cell test device, regardless of an object to be measured.

In addition, in the present embodiment, the reagent container is taken as an example of a consumable used in the automatic analyzer, but the same effect can be obtained even in consumables used in the automatic analyzer, such as an auxiliary reagent, a reaction container, and a dispensing tip, and a container for collecting waste liquid or solid waste.

The invention is not limited to the above-described embodiments, and includes various modifications. For example, the above-described embodiments have been described in detail for easy understanding of the invention, and the invention is not necessarily limited to those including all the configurations described above.

Further, a part of a configuration according to one embodiment can be exchanged with a configuration according to another embodiment, and the configuration according to another embodiment can be added to the configuration according to one embodiment. In addition, a part of the configuration of each embodiment can be added, deleted, or exchanged with other configurations.

REFERENCE SIGNS LIST

201: automatic analyzer
202: rack transport unit
203: analysis unit
204: control unit
205: operation unit
218: reagent bottle
302: rack transport line
303: rack
304: specimen container
305: rack transport unit
306: reagent cold insulation unit
307: incubator (reaction disk)
308: sample dispensing mechanism
309: reagent dispensing mechanism
310: consumables transport unit
311: detection unit
311a: reaction liquid aspiration mechanism
313: reagent container
314: reaction container
315: storage device
316: display (display unit)
317: auxiliary reagent feeding unit
318: reagent bottle
319, 321: cover
322, 328: lock mechanism
323, 324, 326: indicator
325: syringe
327: reagent disk cover
329: state display unit
330: Reagent button
331: overview screen
332: details screen
333: reagent exchange mode button
334: measurement information display screen
335: analysis unit selection screen
336: Module 1 button
337: Module 2 button
338: Perform button
339: Cancel button
340: reagent registration reception screen
341: Module button
342: Module button
343: Perform button
344: Cancel button
345: Reagent Registration button

The invention claimed is:

1. An automatic analyzer, comprising:
an analysis unit including a plurality of operation units for performing analysis of a specimen; and
a control unit configured to control the analysis unit, wherein
the control unit is configured to allow the analysis unit to set to at least (a) an analysis operation mode in which a first operation unit and a second operation unit are operated for the analysis of the specimen, (b) a partial operation mode in which only the first operation unit is continuously operated after the analysis of the specimen is completed in the analysis operation mode, and (c) a reagent exchange mode in which consumables containing a reagent are exchangeable in the analysis unit, and
the control unit, in the partial operation mode, is configured to allow the analysis unit to shift from the partial operation mode to the reagent exchange mode, when receiving a state transition instruction,
the first operation unit includes at least temperature adjusting unit of an incubator and/or an auxiliary reagent feeding unit, and
the second operation unit includes a unit provided in the analysis unit other than the first operation unit, and
wherein upon completion of the reagent exchange mode, the control unit returns the analysis unit to the partial operation mode without performing a part of an operation executed in a preparation mode.

2. The automatic analyzer according to claim 1, further comprising:
a cover configured to cover at least a part of the analysis unit; and
a lock mechanism configured to lock the cover, wherein
the control unit is configured to unlock the lock mechanism when the analysis unit shifts from the partial operation mode to the reagent exchange mode.

3. The automatic analyzer according to claim 2, further comprising:
an indicator configured to indicate whether the consumables containing the reagent are exchangeable by an operator, wherein
the control unit changes display of the indicator when the analysis unit shifts from the partial operation mode to the reagent exchange mode.

4. The automatic analyzer according to claim 1, wherein
a plurality of the analysis units are provided, and
the control unit receives the state transition instruction, when all the plurality of the analysis units shift from the analysis operation mode to the partial operation mode.

5. The automatic analyzer according to claim 4, wherein
the control unit, in the reagent exchange mode, is configured to allow an operator to select one of the plurality of the analysis units to transition to the reagent exchange mode.

6. The automatic analyzer according to claim 1, wherein
the control unit is configured to be able to execute a reagent registration mode for registering information on the reagent after the reagent exchange mode is completed.

7. The automatic analyzer according to claim 1, wherein
the control unit, in the partial operation mode, displays a measurement information display screen for displaying executable measurement items on a display unit, and also displays a button for inputting the state transition instruction to the measurement information display screen.

8. The automatic analyzer according to claim 7, wherein
the measurement information display screen displays information on a type of a reagent container, a position where the reagent container is mounted, a remaining amount of each reagent container, or an expiration date.

9. The automatic analyzer according to claim 1, wherein in an operation of transition from the partial operation mode to the reagent exchange mode, the control unit retracts at least one drive mechanism to a position that is physically inaccessible or more difficult to access by a user.

10. An automatic analyzer, comprising:

an analysis unit including a plurality of operation units for performing analysis of a specimen; and a control unit configured to control the analysis unit, wherein the control unit is configured to allow the analysis unit to set to at least (a) an analysis operation mode in which a first operation unit and a second operation unit are operated for the analysis of the specimen, (b) a partial operation mode in which only the first operation unit is continuously operated after the analysis of the specimen is completed in the analysis operation mode, and (c) a reagent exchange mode in which consumables containing a reagent is exchangeable in the analysis unit, and the control unit, in the partial operation mode, is configured to allow the analysis unit to shift from the partial operation mode to the reagent exchange mode, when receiving a state transition instruction, the partial operation mode is a rack reception mode prepared for additional specimen input after measurement of the specimen stored in the analysis unit is completed, and wherein upon completion of the reagent exchange mode, the control unit returns the analysis unit to the partial operation mode without performing a part of an operation executed in a preparation mode.

11. An automatic analyzer, comprising:

an analysis unit including a plurality of operation units for performing analysis of a specimen; and a control unit configured to control the analysis unit, wherein the control unit is configured to allow the analysis unit to set to at least (a) an analysis operation mode in which a first operation unit and a second operation unit are operated for the analysis of the specimen, (b) a partial operation mode in which only the first operation unit is continuously operated after the analysis of the specimen is completed in the analysis operation mode, and (c) a reagent exchange mode in which consumables containing a reagent is exchangeable in the analysis unit, and the control unit, in the partial operation mode, is configured to allow the analysis unit to shift from the partial operation mode to the reagent exchange mode, when receiving a state transition instruction, wherein upon completion of the reagent exchange mode, the control unit returns the analysis unit to the partial operation mode without performing a part of an operation executed in a preparation mode, and wherein transitioning from the partial operation mode to the reagent exchange mode is completed in a shorter required time than transitioning from the analysis operation mode to a standby mode.

12. The automatic analyzer according to claim 11, wherein the standby mode is a state in which the analysis unit is stopped.

13. An automatic analyzer, comprising:

an analysis unit including a plurality of operation units for performing analysis of a specimen; and a control unit configured to control the analysis unit, wherein operation mode in which a first operation unit and a second operation unit are operated for the analysis of the specimen, (b) a partial operation mode in which only the first operation unit is continuously operated after the analysis of the specimen is completed in the analysis operation mode, and (c) a reagent exchange mode in which consumables containing a reagent is exchangeable in the analysis unit, and the control unit, in the partial operation mode, is configured to allow the analysis unit to shift from the partial operation mode to the reagent exchange mode, when receiving a state transition instruction, wherein upon completion of the reagent exchange mode, the control unit returns the analysis unit to the partial operation mode without performing a part of an operation executed in a preparation mode, and wherein transitioning from the reagent exchange mode to the partial operation mode is completed in a shorter required time than transitioning from a standby mode to the analysis operation mode.

14. The automatic analyzer according to claim 13, wherein the standby mode is a state in which the analysis unit is stopped.

15. An automatic analyzer, comprising:

an analysis unit including a plurality of operation units for performing analysis of a specimen; and a control unit configured to control the analysis unit, wherein the control unit is configured to allow the analysis unit to set to at least (a) an analysis operation mode in which a first operation unit and a second operation unit are operated for the analysis of the specimen, (b) a partial operation mode in which only the first operation unit is continuously operated after the analysis of the specimen is completed in the analysis operation mode, and (c) a reagent exchange mode in which consumables containing a reagent is exchangeable in the analysis unit, and the control unit, in the partial operation mode, is configured to allow the analysis unit to shift from the partial operation mode to the reagent exchange mode, when receiving a state transition instruction, wherein upon completion of the reagent exchange mode, the control unit returns the analysis unit to the partial operation mode without performing a part of an operation executed in a preparation mode, and in an operation of transition from the reagent exchange mode to the partial operation mode, the control unit omits a part of the operation of transition based upon information of a sensor or information of an RFID tag of the consumables including a reagent container.

16. An automatic analyzer, comprising:

an analysis unit including a plurality of operation units for performing analysis of a specimen; and a control unit configured to control the analysis unit, wherein the control unit is configured to allow the analysis unit to set to at least (a) an analysis operation mode in which a first operation unit and a second operation unit are operated for the analysis of the specimen, (b) a partial operation mode in which only the first operation unit is continuously operated after the analysis of the specimen is completed in the analysis operation mode, and (c) a reagent exchange mode in which consumables containing a reagent is exchangeable in the analysis unit, and the control unit, in the partial operation mode, is configured to allow the analysis unit to shift from the partial operation mode to the reagent exchange mode, when receiving a state transition instruction, wherein upon completion of the reagent exchange mode, the control unit returns the analysis unit to the partial operation mode without performing a part of an operation executed in a preparation mode, and in an operation of transition from the reagent exchange mode to the partial operation mode, the control unit omits a part of the operation of transition based upon an elapsed time from the transition to the reagent exchange mode.

* * * * *